United States Patent [19]

Muskovitz et al.

[11] Patent Number: 5,175,806
[45] Date of Patent: Dec. 29, 1992

[54] METHOD AND APPARATUS FOR FAST SURFACE DETAIL APPLICATION TO AN IMAGE

[75] Inventors: Joshua E. Muskovitz, Comstock Park; Robert S. Newton; Tirthawan Tanade, both of Grand Rapids, all of Mich.

[73] Assignee: Computer Design, Inc., Grand Rapids, Mich.

[21] Appl. No.: 329,771

[22] Filed: Mar. 28, 1989

[51] Int. Cl.⁵ .......................................... G06F 15/20
[52] U.S. Cl. ................................... 395/125; 395/129
[58] Field of Search ................. 364/518, 521, 522; 358/93; 340/716, 721, 723; 395/119, 120, 125, 129, 130, 135, 155

[56] References Cited

U.S. PATENT DOCUMENTS

| | | | |
|---|---|---|---|
| 3,534,396 | 10/1970 | Hart et al. | 235/61.6 |
| 3,614,410 | 10/1971 | Bailey | 235/186 |
| 3,621,214 | 11/1971 | Romney et al. | 235/151 |
| 3,636,328 | 1/1972 | Korelitz et al. | 235/151.1 |
| 3,653,071 | 3/1972 | Hill et al. | 444/1 |
| 3,693,168 | 9/1972 | Halkyard et al. | 340/172.5 |
| 3,716,705 | 2/1973 | Newell | 235/151 |
| 3,732,557 | 5/1973 | Evans et al. | 340/324 |
| 4,058,849 | 11/1977 | Fitzgerald et al. | 364/520 |
| 4,070,710 | 1/1978 | Sukonick et al. | 366/900 |
| 4,261,012 | 4/1981 | Maloomian | 358/93 |
| 4,539,585 | 9/1985 | Spackova et al. | 358/93 |
| 4,546,434 | 10/1985 | Gioello | 364/300 |
| 4,888,713 | 12/1989 | Falk | 364/522 |
| 4,949,286 | 8/1990 | Ohba | 364/521 |

OTHER PUBLICATIONS

Copending Appl. S/N 904,682, filed Sep. 6, 1986 for a Surface Detail Mapping System.
Excerpt #1 from Rogers Book, PROCEDURAL ELEMENTS FOR COMPUTER GRAPHICS, pp. 354-362, McGraw-Hill, 1985.
Excerpt #2 from Rogers Book, PROCEDURAL ELEMENTS FOR COMPUTER GRAPHICS, pp. 401-403, McGraw-Hill, 1985.
Blinn & Newell Article "Texture & Reflection in Computer Generated Images" pp. 542-547 *Communications of the ACM*, Oct, 1976.
Blinn Article "Simulation of Wrinkled Surfaces", vol. 12, pp. 286-292 *Proceedings of SIGGRAPH*, 1978.
Cook & Oakes Article "Mapping Methods for Generating 3-D Meshes", pp. 67-72 *Computers in Mechanical Engineering*, Aug. 1982.
"Computer Display of Curved Surfaces" by Edwin Catmull, pp. 11-17, Proceedings of IEE Conference on Computer Graphics, Pattern Recognition and Data Structure, May 1975.
"Electronic Clones are Coming" by Don Sutherland, pp. 106-107, 144-148, Popular Photography, Dec. 1976.

(List continued on next page.)

*Primary Examiner*—Heather R. Herndon
*Attorney, Agent, or Firm*—Price, Heneveld, Cooper DeWitt & Litton

[57] ABSTRACT

A system and method for use with a two-dimensional CAD system for rapidly applying surface detail, such as various patterns, to a 2-D image in a manner to provide a 3-D appearance. During a preprocessisng step, a 2-D image to which a perspective mesh has been applied, is scanned pixel-by-pixel and several tables are built of data derived from parameters of each pixel. The tables are used during a fast mapping step to apply pixels making up the surface detail or pattern very rapidly without compromising the visual appearance of the resulting image. One table is built of the two-dimensional offsets of image pixels from references in the mesh grid and is used to map to a pair of one-dimensional tables specific to a selected pattern array to select offset coordinates for mapping quickly to the appropriate pattern pixels. Another table includes data derived from color parameters of the image and is used during mapping to rapidly tint the image with the pattern primary colors while preserving the shading and texture of the original image.

40 Claims, 6 Drawing Sheets

OTHER PUBLICATIONS

"Digital Scene Simulation"$^{S.M.}$: The Synergy of Computer Technology and Human Creativity: by Gary Demos, Maxine D. Brown and Richard A. Weinberg, pp. 22-31, Proceedings of the IEEE, vol. 72, No. 1, Jan 1984.

"C-D Images for the Film Industry" by W. Mike Tyler, Computer Graphics World (Jul. 1984).

"Combining Physical and Visual Stimulation—Creation of the Planet Jupitor for the Film '2010'" by Larry Yeager, Craig Upson and Robert Myers, pp. 85-93, ACM SIGGRAPH proceedings '86, vol. 20, No. 4, Aug. 1986.

"Supercomputing for High Complexity Computer Graphics" by Gary Demos and Greg Colbrook, unpublished (1984).

"Digital Production Honored" by Louis Chunovic, Millimeter Jun. 1985.

"Pyramidal Parametrics" by Lance Williams, pp. 1-11, Computer Graphics, vol. 17, No. 3 (Jul. 1983).

"On Coons and Other Methods for the Representation of Curved Surfaces" by A. R. Forrest, pp. 341-359, Computer Graphics and Image Processing (1972).

METHOD AND APPARATUS FOR FAST SURFACE DETAIL APPLICATION TO AN IMAGE

BACKGROUND OF THE INVENTION

This invention relates to computer-aided design (CAD) systems, and in particular to a method and apparatus for providing surface detail in a two-dimensional design system. The present invention has specific applications to the apparel, footwear and interior design industries.

In the field of computer-aided design, one of the objectives of any CAD system is to display a realistic image of the object displayed on the graphic visual output device, e.g., the cathode ray terminal ("CRT") of the system. A technique for enhancing the realism of the generated image is the addition of surface detail for areas making up the image using texture mapping techniques. Such texture mapping techniques have been employed in three-dimensional ("3-D") CAD systems, notably those used in making animated films. A technique for producing a realistic image of a three-dimensional object in a two-dimensional ("2-D") CAD system and applying surface detail to the image is disclosed in the Edward K. Falk, U.S. Pat. No. 4,888,713 for a SURFACE DETAIL MAPPING SYSTEM, issued Dec. 19, 1989, and assigned to the assignee of the present application. The Falk application discloses a system in which a 2-D image is created in a computer through use of an input device, such as a frame buffer capture camera or digitizing scanner, or created by the user through the use of other image design software tools, such as conventional "paintbox" programs. Tools are provided to define segments of an image and to generate and modify a mesh in segments or portions of segments to allow the designer to create a 3-D appearance to the image. The system disclosed in the Falk patent further stores an array of pixels representing a desired surface detail, such as a fabric pattern, or the like. Means are provided for calculating for each pixel in the image the coordinates of the corresponding surface detail pixel based on the location of the image pixel in the grid and the position of the grid in the mesh. Means are provided for mapping the coordinates for each image pixel to the array of pixels representing the surface detail and for selecting the corresponding pixel in order to generate a graphic visual image of the 2-D image with surface detail applied.

In applying surface detail to a 2-D image of a 3-D object, distortions in fitting the pattern to the image causes pixel compression to occur where more than one pattern pixel maps to an image pixel and pixel "dropout" to occur where no pattern pixel exists for an image pixel. Conventional techniques compensate for pixel compression and pixel "dropouts" in mapping systems by applying bi-linear interpolation during mapping. It is also known that the shading and texture of the original image may be preserved notwithstanding the application of the surface detail by converting the image and surface detail pixel data from (R,G,B) parameters to (H,S,V) parameters, selecting the H and S components from the surface detail pixel data, multiplying the V parameters of the image and surface detail pixel data and dividing by 256 to obtain a composite (H,S,V) parameter for the new image pixel. The (H,S,V) parameters are subsequently converted to (R,G,B) parameters for the new image pixel.

While the invention set forth in the Falk application provided for the first time a technique, for use in a 2-D CAD system, of selectively applying alternate surface detail, or patterns, stored in the computer memory to an image in order to create the appearance of a 3-D object, the system requires on the order of two minutes of time to perform the surface detail mapping process. The system is, thus, impractical for use as a sales tool to, for example, illustrate to a consumer the appearance of an upholstered furniture item in which various fabric designs may be selectively applied. The length of the mapping process interrupts the rhythm of the presentation by the sales person. Additionally, the length of the mapping process impedes the effectiveness of the Falk system as a design tool in the hands of an experienced designer.

SUMMARY OF THE INVENTION

It is an object of the present invention to provide a method and system that is capable of applying surface detail to the graphic image of a 3-D object in a 2-D CAD system in a very fast manner, while retaining, and improving upon, the excellent 3-D appearance of the 2-D graphic image provided in the Falk system. The invention arises from a recognition that several time-consuming steps in the surface detail mapping system disclosed in the Falk patent can be carried out in a unique manner and stored in files with the image during a preprocessing phase. The patent of surface detail is carried out by a fast mapping process avoiding the time-consuming steps. If it is desired to modify the surface detail of the image by applying a different pattern, only the fast surface detail application process is repeated. The invention further arises from the discovery of several unique speed-improving processing techniques for use with the fast surface detail application process.

According to one aspect of the invention, a perspective mesh is generated on a two-dimensional graphic image such that the mesh creates a three-dimensional visual appearance. A two-dimensional buffer, at least the size of the two-dimensional graphic image is allocated and the two-dimensional graphic image is scanned pixel-by-pixel. A table is built by storing parameters of each scanned pixel in a corresponding location in the buffer. The surface detail is applied to the two-dimensional graphic image by operating on the array of pixels making up the selected surface detail, with the data in the tables, during the surface detail application process.

According to another aspect of the present invention, the time-consuming calculation of the relative position of each image pixel with respect to the corresponding sub-grid in the grid and with respect to the grid in the image segment is eliminated in the application of surface detail to the image by calculating and storing in a table, during the preprocessing phase, the two-dimensional offset coordinates of each image pixel with respect to reference locations on the perspective mesh. During the fast surface detail application process, the stored offset coordinates are retrieved and used to map to the array of pixels making up the selected surface detail in order to select the appropriate pixels.

According to another aspect of the invention, the table of two-dimensional offset coordinates is used in conjunction with a pair of one-dimensional tables each having a length corresponding to one dimension of the two-dimensional table. When the user selects a pattern, or other surface detail, to apply to an image, the dimensions of the selected rectangular array of pixels making up the surface detail are determined and offset coordinates are written repetitively in one-dimensional buffers, until the buffers are full, to build the one-dimensional tables. During the fast detail application phase, the two-dimensional offset coordinates in the two-dimensional table are mapped to the appropriate locations in the two one-dimensional pattern specific tables to select a pair of one-dimensional pattern offset coordinates used to map to the appropriate pixel in the array of pixels making up the surface detail.

According to yet another aspect of the present invention, the magnitudes of the primary colors of each image pixel are preprocessed to extract shading and texture data, which is used to build a table in a two-dimensional buffer during the preprocessing phase. During the fast surface detail application phase, the shading-derived data is applied directly to the primary colors of the corresponding surface detail pixels without requiring conversion to a different set of units and back to primary colors.

These and other related objects, advantages and features of this invention will become apparent upon review of the following specification in conjunction with the drawings.

DESCRIPTION OF THE PREFERRED EMBODIMENT

A. Description of the Hardware

Figure 1:
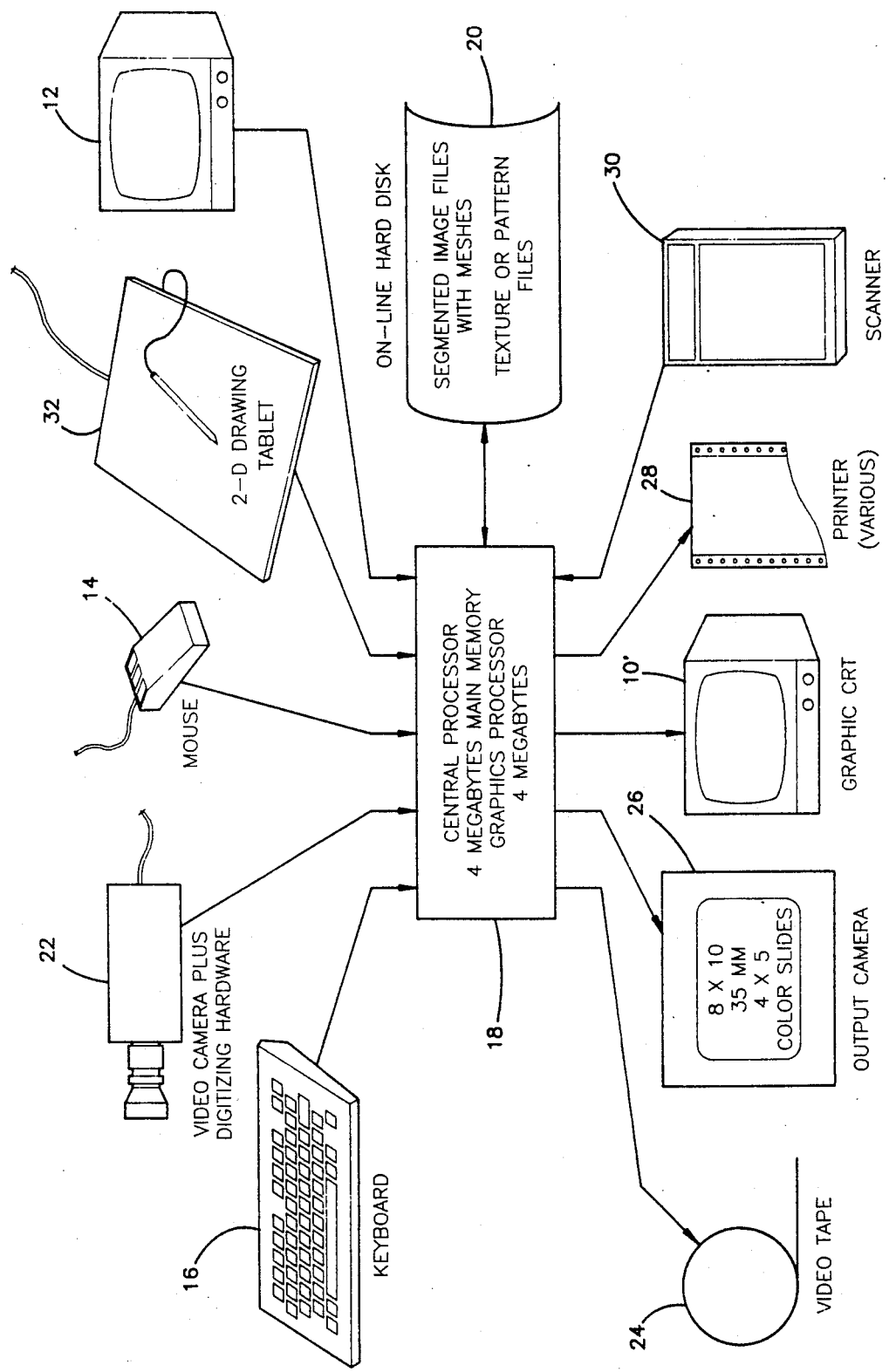
FIG. 1 is an illustration of a CAD hardware system of the type that may be used in the present invention.

Referring now specifically to the drawings, and the illustrative embodiments depicted therein, the hardware requirements to support the present invention are basically those needed to support a standard two-dimensional CAD and image processing system. Such a system, illustrated in FIG. 1, includes a graphic visual input/output device, e.g. a CRT 10, usable with a locating device, such as mouse 14 or digitizing tablet 32, a keyboard 16, a central processing unit 18 that will support general program control and the control of the individual pixels displayed on the graphic CRT 10, a data storage unit 20, preferably a hard disk storage unit and a color text monitor 12. If the images used in the system are to be inputted through a video input, a frame capture camera 22, or for images derived from photographs or sketches, a digitizing scanner 15, is also required. The data storage unit 20 is provided for storage of the data files supporting the two-dimensional software system including the digital graphic images, segments and meshes thereon, the data tables generated during the preprocessing phase and images of surface detail such as patterns and fabrics.

A minimum of 256 and preferably greater than 4096 simultaneously displayable colors are desirable in a system with video frame capture camera input, in which surface detail mapping is performed by the software. Adequate facilities for performing these functions are found in most of the "Engineering workstations" currently available in today's CAD market. The present invention is preferably used in a system that is based on a configuration based on an IBM Model AT or equivalent system. Graphic CRT 10 has a viewable resolution of 768 vertical pixels and 1024 horizontal pixels. Processing unit 18 includes a graphics board, with a graphics processor and four megabytes of memory, for program storage and video frame buffer supporting up to 16.7 million simultaneously displayable colors, a video memory expansion board with four megabytes of memory, and two forty-four megabyte hard disk drives 20. This is the basic system used to support the illustrated embodiment of this invention.

In addition to the basic features described, additional functions may be added to provide additional means for the input of images to the system. These include the support of television input of images and surface detail patterns through the use of a video camera or a video frame capture camera 22 and a general purpose interface bus (GPIB) to provide an interface with a high resolution full color digitizing scanner 15. The output of the system can be directed in known manner to a video tape 24 for later viewing, to output camera 26 which is capable of producing color slides or photographs of various sizes, to a graphic CRT 10, or to a full color, high resolution, printer 28 to provide a hard copy output.

B. Description of the Software

Surface detail application in a 2-D CAD system is divided into two distinct phases or steps. During a preprocessing step that is applied once to each image, data sets, or tables, are produced for storage and subsequent retrieval for use in the second process, or step, during which the actual surface detail application is performed. The program is organized in a manner to perform time-consuming operations in the preprocessing portion of the program. The tables developed therein may be repetitively used to apply different textures or patterns to the image rapidly and, if desired, to restore the image to its original appearance faster than the image could be retrieved from the hard disk.

Once an image is created on the graphic CRT of the 2-D CAD system, through the use of an input device, or is designed by the user, the two-dimensional image is preprocessed. A two-dimensional image being worked on should be realizable as a set of constituent parts that, though perhaps appearing to be three-dimensional objects, are simply the projection into two dimensions of the parts making up the object. The individual parts making up the object (in the case of apparel: sleeves, fronts, yokes, etc.) are then segmented into different contiguous areas by user-defined polylines and polysplines to create a closed region that describes the physical contiguous outline of a portion of the image. Once the image is completely defined by separate segments, a grid mesh, describing the topological shape of that segment, is applied and modified by the user to provide the proper curves and "wrinkles" in order to improve the three-dimensional appearance of the image. From these grid lines and control lines, a mesh is generated that follows the contour of the created image topology. In like manner, grids and control lines are created for each segment of the image and are stored, along with the image, on the hard disk.

Preprocessing proceeds from the image file and its associated segment and mesh data files. A Pattern Offset Table is created in a two-dimensional "shadow" buffer of a size selected to be the same as that of the image. The table of offsets to the normalized pattern is created by initially filling the shadow buffer with illegal entries. As offset coordinates of image pixels from associated grids and segments are calculated, the illegal entries are replaced with actual two-dimensional offset coordinates of a worst case array of pixels making up the surface detail, or pattern, that is larger than any anticipated real pattern. In the illustrated embodiment, the worst case pattern is the size of the resolution of graphic CRT 10 (768 vertical pixels by 1024 horizontal pixels). The purpose of establishing a worst case pattern is to insure that all patterns which are finally applied are contained within the Pattern Offset Table and not cropped. A linear progression through the pixels of the image, starting at the lower left of the image and proceeding left-to-right along the scan lines for the width of the image, and then up the image for every scan line and a similar progression through the Pattern Offset Table, will yield the associated two-dimensional offsets for each pixel in the hypothetical pattern with illegal entries filling all other positions in the table. Once the PO Table has been created, it is stored as a file with the associated image file, image segment file and segment grid file and is subsequently retrieved with the image file for use in the fast surface detail application process.

The preprocessing further includes a pixel-by-pixel conversion of the color parameters, typically provided as normalized primary color constituents, or (R,G,B) parameters, with a preselected algorithm and storage of the resulting data in an HSV Table having the same dimensions as that of the Pattern Offset Table. During the surface detail application process, the (R,G,B) parameters of the surface detail pixels, selected by mapping the offset coordinates in the PO Table to the array of pixels making up the surface detail, or pattern, are mapped to the HSV Table and combined with the processed image pixel data. The algorithm for preprocessing of the (R,G,B) parameters of the image pixels is preselected such that the combination with the surface detail color parameters is effected merely by multiplying each of the (R,G,B) components of the pattern pixel by the component in the HSV Table and dividing by a predetermined number. In a preferred embodiment, the HSV Table is created during preprocessing by determining the value component V of the (H,S,V) parameter of each image pixel, and each (R,G,B) parameter of the pattern pixel is multiplied by the V component of the image pixel and the result divided by 256 during surface detail application. The multiplication process is time-efficient and the division by 256 is digitally effected by binary shifting. In a most preferred embodiment, the V component of each image pixel is determined during preprocessing by selecting the maximum magnitude of the (R,G,B) components of the image pixel and assigning that value to V. The HSV Table is constructed by a linear progression through the pixels of the image, starting at the lower left of the image and proceeding left-to-right along the scan line for the width of the image and then up the image for every scan line. For each pixel at which the image is not defined, the value of V is set at 0. The HSV Table is stored with the image file, the image segment file, the segment grid file and the image Pattern Offset Table file.

The "surface detail," also known as "textures" or "patterns" may be digitized images brought into the system via video camera input, or they may have been designed using other facilities. Those facilities may be "paint" programs or "fabric weaving" programs, such as the one disclosed in U.S. Pat. No. 5,016,183 issued to Emory Shyong, entitled TEXTILE DESIGN SYSTEM AND METHOD and assigned to the assignee of the present application. The textures or patterns are stored on the system hard disk as a rectangular array of pixels. After the image preprocessing has been performed, and prior to the fast surface detail application process, a particular pattern or texture is user-selected through a "pattern window" which outlines the rectangular array of pixels in the pattern which is to be repeated as the pattern repeat. The horizontal and vertical dimensions (X and Y) of the pattern window used in making the selection are determined and used to create a pair of Pattern Specific Offset Tables (PSO Table), one for the X-direction and one for the Y-direction. Each such table is one-dimensional and, the PSO Table for the X-direction is built in a one-dimensional buffer having a length equal to the horizontal screen resolution of the graphic CRT of the CAD system. The PSO Table for the Y-direction is built in a one-dimension buffer having a length equal to the vertical screen resolution of the graphic CRT of the CAD system. The contents of each of these tables consists of a repetition of a sequence of one-dimensional offset coordinates defining the corresponding pattern dimension, repeated until the buffer is full. Thus, if the "pattern window" is M-by-N pixels, the PSO Tables will appear as follows:
[0,1,2,3, ..., M-1,0,1,2,3, ..., M-1,0,1,2,3, ... ]
[0,1,2,3, ..., N-1,0,1,2,3, ...; N-1,0,1,2,3, ..., N-1,0,1, ...]

Once the PO Table, the HSV Table and the PSO Tables are created, the fast detail application process may be carried out. The surface detail application starts at the lower left corner of the image and progresses pixel-by-pixel from left-to-right, bottom-to-top. As the pattern is being applied to the image, pointers to the tables are maintained and indexed accordingly. For each pixel of the graphic CRT of the CAD system, a two-dimensional pattern offset coordinate (X,Y) is retrieved from the PO Table. The X-coordinate is mapped to the horizontal PSO Table and the appropriate one-dimensional actual pattern offset coordinate is selected. Likewise, the Y-coordinate from the PO Table is mapped to the vertical PSO Table and the appropriate one-dimensional actual pattern offset is selected. The pair of offset coordinates selected from the PSO Tables are mapped to the array of pixels making up the selected surface detail pattern to select the appropriate pixel. The color parameters of the selected surface detail pixel are modified by the V parameter from the HSV Table to establish the (R,G,B) parameter for the image pixel.

If, during the fast surface detail application process, an illegal offset value is read from the PO Table, a pixel "dropout" has been located and is replaced by the average of the (R,G,B) parameters of the pixel in the vertical columns to the left of the dropout and the horizontal row below the dropout. Because the image on the graphic CRT having surface detail applied is a continuous-tone image, the resulting filling of the dropouts in this manner has a pleasing appearance that is visually indistinguishable from the computationally complex bi-linear interpolation techniques, and is much faster. Because the detail mapping is performed beginning at the left bottom of the image, the averaging is performed with pixels which will always exist. Therefore, every dropout will be replaced regardless of the number of dropouts.

C. Detailed Description of the Software

Figure 2:
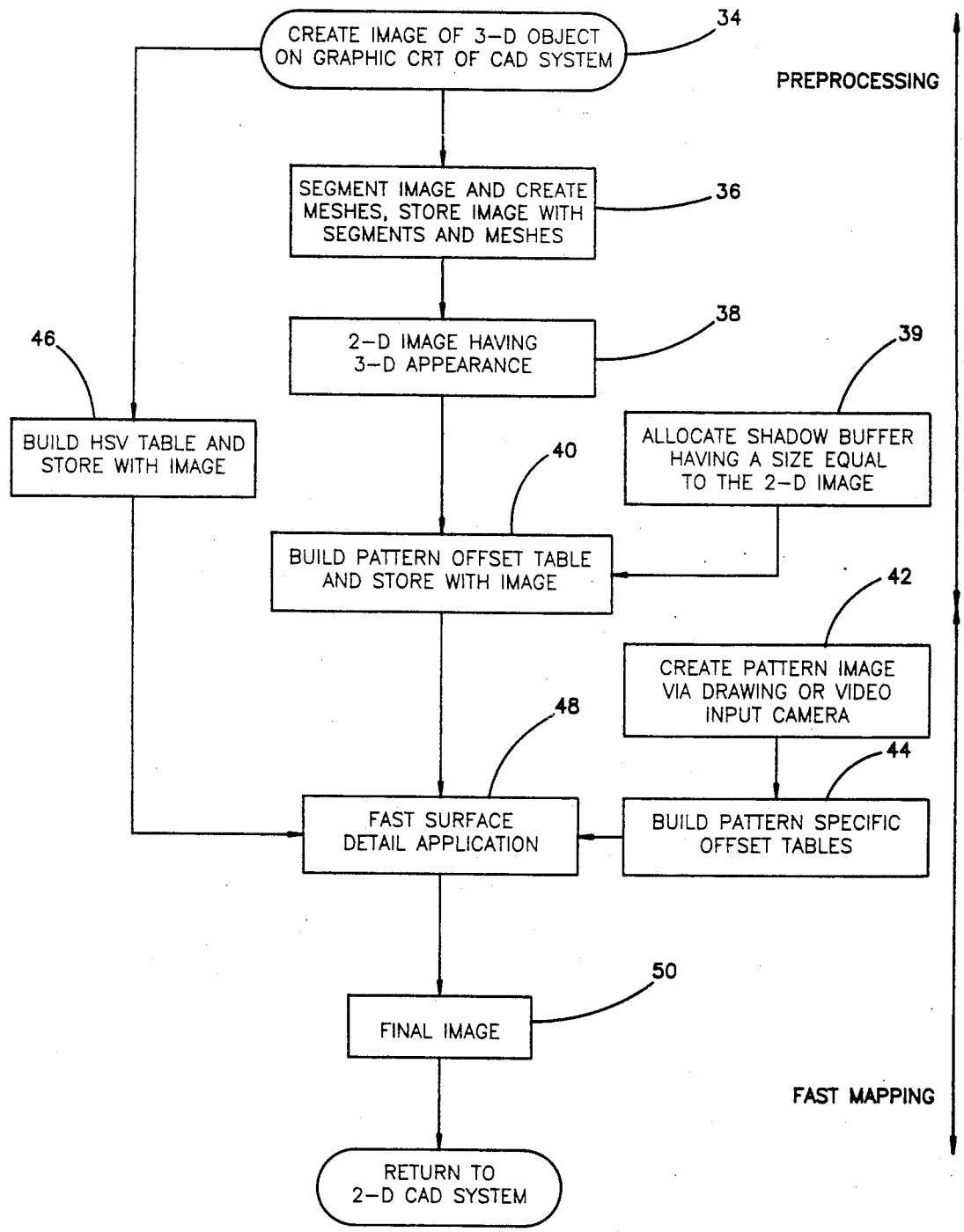
FIG. 2 is a flow chart illustrating a portion of the 2-D CAD system according to the present invention.

Referring to FIG. 2, a portion of a two-dimensional CAD system employing the present invention is illustrated. The process begins with the drawing or video camera input of an image 34. The drawing may be accomplished using a "paint program," which is a standard feature of many two-dimensional computerized CAD systems. Video camera input requires the use of a video camera 22 and associated standard hardware for digitizing images to be interfaced with the computer system. In either case, the result will be an array of pixels making up the image displayed on the graphic CRT 10 of the system, which can be stored to and retrieved from the data storage unit 20. Once an image is created, the system disclosed in U.S. patent application Ser. No. 904,682, filed Sep. 5, 1986, by Edward K. Falk, for SURFACE DETAIL MAPPING SYSTEM, now issued as U.S. Pat. No. 4,888,713 the disclosure of which is incorporated herein by reference and will not be repeated here, is then applied. Suffice it to say, the next step 36 is for the user to employ a manual digitizing process to bound or separate the different distinct areas making up the image. The program to support this would accept for each segment a series of (X,Y) coordinates from the user via a locating instrument such as mouse 14. Once all of the (X,Y) points for a segment have been entered, the program creates a segment polygon from the points and stores this definition with the image in the data storage unit 20. That process is repeated until the user has segmented all of the areas of interest in the image. Once all of the segment polygons have been created and stored, the next step is for the user to create meshes on each segment using a mesh generating program function. The mesh grids can then be manipulated until the image has a realistic 3-D appearance at 38.

During the preprocessing phase, the program allocates (39) a two-dimensional buffer having a size equal to that of the image and stores an illegal data entry, such as −1, in each location in the buffer. The program scans the segmented image, to which a perspective mesh is applied, pixel-by-pixel and builds (40) a Pattern Offset Table by replacing the illegal data entries in the shadow buffer location for each image pixel. The data stored in the PO Table are the two-dimensional offsets of the pixels in a normalized pattern applied to the image. The offsets are calculated from image reference coordinates such as offsets from grids, offsets of the grids in the mesh and the meshes in the segment. The PO Table is stored as a data file with the corresponding image file.

During the preprocessing phase, the program additionally scans the image on the graphic CRT pixel-by-pixel and builds (46) a table, designated an HSV Table, in another buffer equal in size to the resolution of the graphic CRT. The HSV Table is built from the (R,G,B) parameter of each pixel by examining the magnitude of each primary color and selecting the largest such magnitude as a representation of the value coordinate (v) in the (H,S,V) system. The HSV Table is stored as a data file with its corresponding image file.

Texture or pattern images 42 are created in a manner similar to the object image and stored (44) for later application. The textures or pattern images are also stored as an array of pixels on the data storage unit 20. In preparation for applying a selected pattern to an image displayed on the graphic CRT, the user digitizes, using mouse 14, two coordinates on the selected image or texture to define an array or window of pixels for use in the surface detail application process as the selected pattern repeat. The size of the pattern window is determined from the selected coordinates and the vertical and horizontal Pattern Specific Offset Tables are built (44). The image file and its associated tables, segment and mesh files, established in the preprocessing phase, are selectively retrieved at 48 by displaying the selected image on the graphic CRT and the surface detail mapping takes place. The description of the functions involved in this process will be described in detail below.

Figure 3:
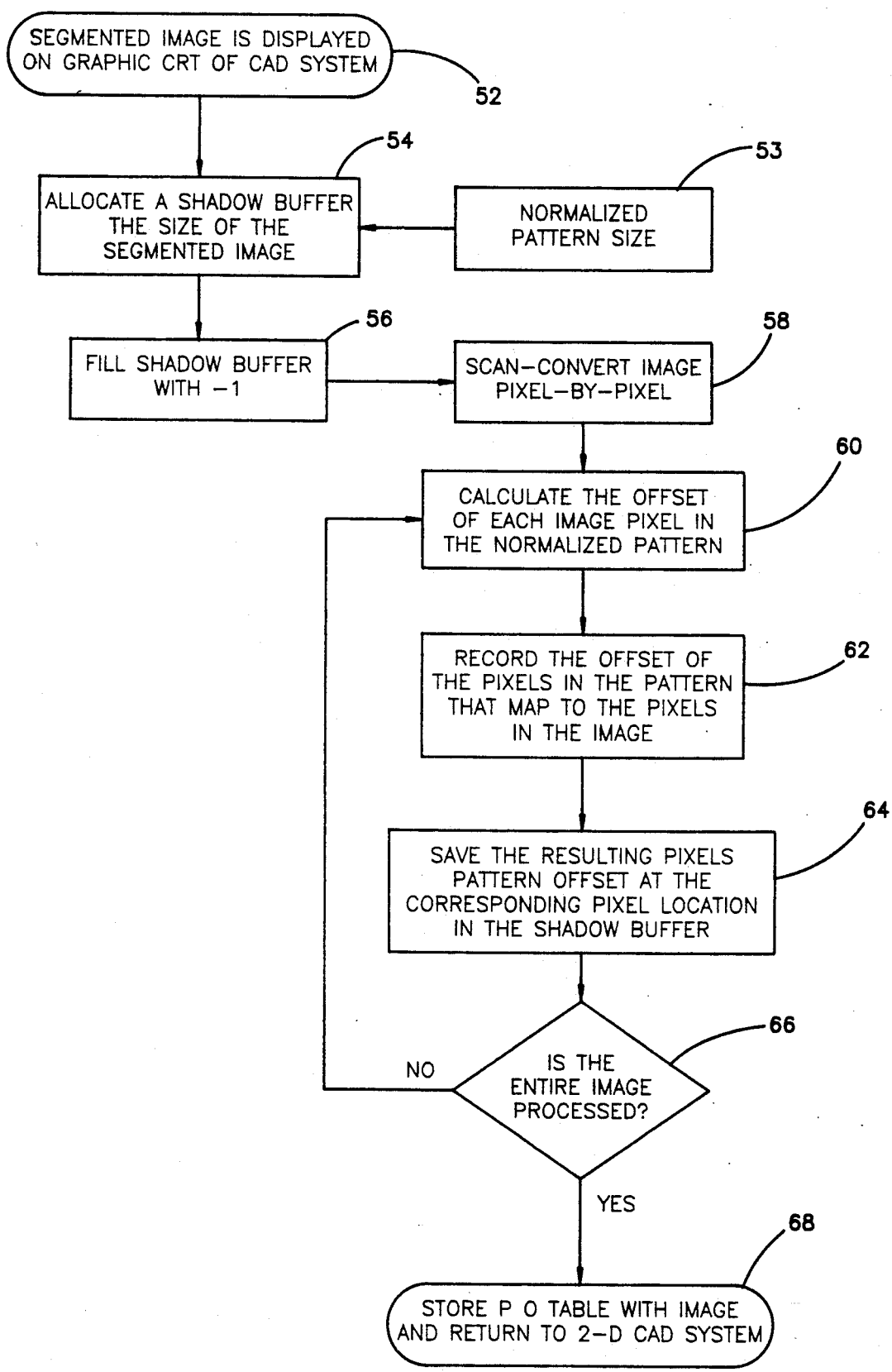
FIG. 3 is a flow chart illustrating the Pattern Offset Table (PO Table) generation function of the present invention.

FIG. 3 is a flow chart of the function that creates, or builds, the Pattern Offset Table. A segmented image is displayed (52) on the graphic CRT of the CAD system by the user retrieving the image file from storage which additionally retrieves the associated segment file and mesh file. A two-dimensional shadow buffer is allocated at 54 having a size that is equal to that of the image. In the illustrated embodiment, each location in the buffer is loaded (56) with the numeral −1 which is interpreted by the system as an illegal entry. The (X,Y) points making up the boundaries of the image and the segment polygons are scan-converted (58), that is, the list of scan lines (row of pixels) contained within the image is created and stored. Each of the scan lines is examined on a pixel-by-pixel basis. If a pixel is found to lie within the image, offset coordinates are calculated (60) to a normalized pattern 53 for this pixel and the offset coordinates recorded (62) in the corresponding location of the shadow buffer (64). In the illustrated embodiment, normalized pattern 53 is selected to be the resolution of the graphic CRT 10, which is 768 vertical pixels by 1024 horizontal pixels. The program then determines at 66 if all of the pixels in the image have been processed and if so, control returns to the 2-D CAD system at 68.

The function for building the normalized Pattern Offset Table for the image in the manner described herein, automatically provides a means for data compression. In this form of data compression, more than one surface detail pixel is mapped to an image pixel. In known systems the pixels are "compressed" by bi-linear interpolation between the parameters of the two or more surface detail pixels. In the present invention, if a subsequently-scanned image pixel has the same location in the shadow buffer as a previously-scanned image pixel, the offset coordinates for the previous pixel are over-written. The offset coordinates remaining in the Pattern Offset Table replaces the group of surface pixels that would have been compressed to one image pixel, effectively dropping several pixels along the scan line. The result is the elimination of all calculation associated with bi-linear interpolation for data compression with virtually no appreciable visual degradation.

Figure 4:
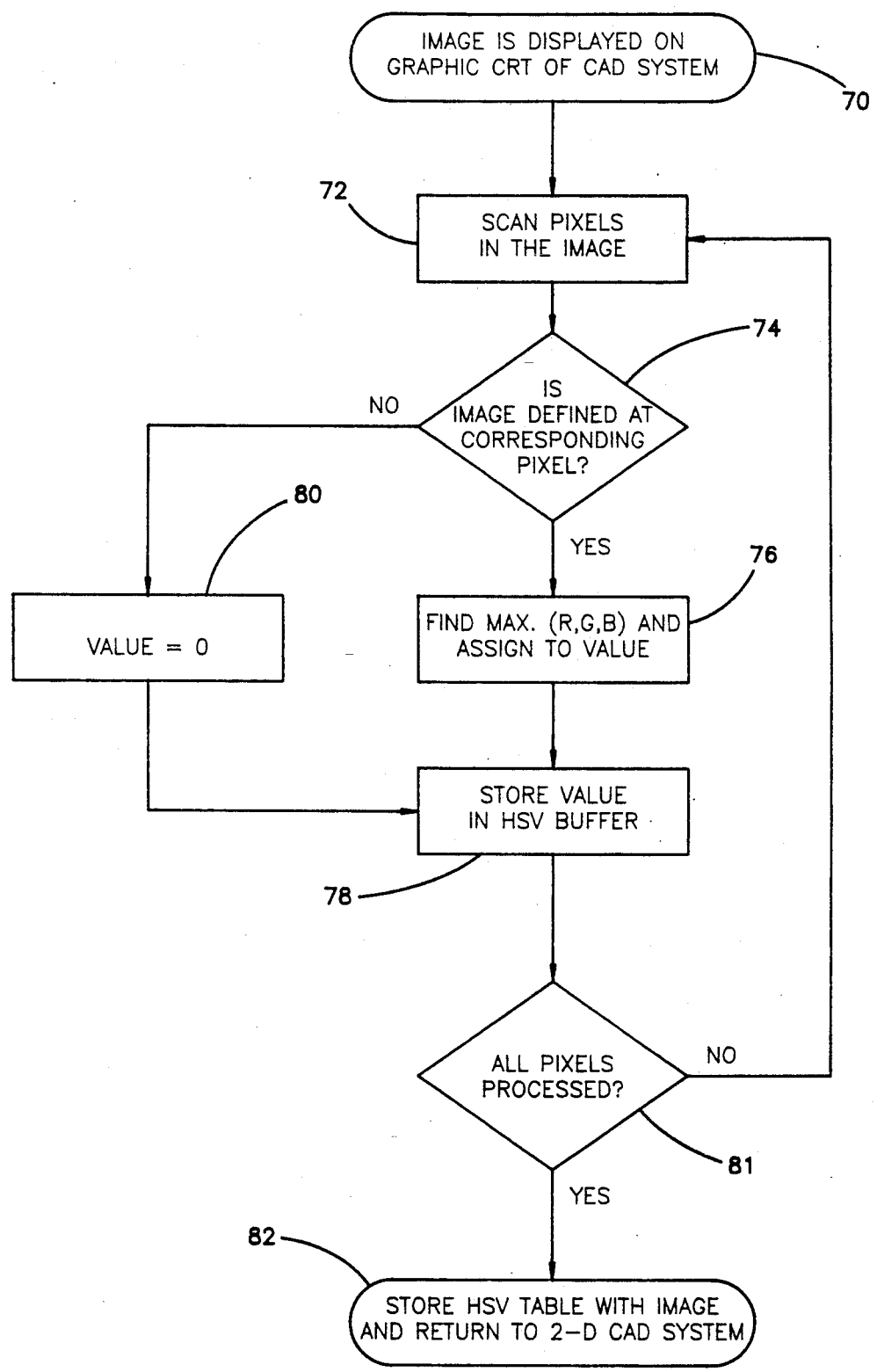
FIG. 4 is a flow chart illustrating the HSV Table generation function of the present invention.

The function for building the HSV Table for each image is illustrated in FIG. 4. Assuming that an image is displayed (70) on the graphic CRT 10 of the CAD system, this function allows the user to build and store an HSV Table with a selected image so that it may be used during the fast surface detail application process to establish the (R,G,B) parameters of the image pixels in a manner that retains the underlying shading of the original image. Each line of the image is scanned (72) and each of the scan lines is examined on a pixel-by-pixel basis. For each pixel it is determined at 74 whether the image is defined at the corresponding pixel. If the image is defined at the corresponding pixel, an algorithm is performed at 76 to determine the value parameter (V) assigned to that pixel. The value parameter is determined by examining the magnitudes of the (R,G,B) parameters, selecting the largest magnitude and assigning that magnitude as the value parameter. The V parameter for the pixel is stored (78) in a buffer having a size corresponding to the vertical and horizontal resolution of the CRT 10. If it is determined at 74 that the image is not defined at the corresponding pixel, the value parameter is set to 0 (80) and the value is stored in the value buffer 78. The program determines at 81 if all image pixels have been processed in this manner and, if so, the program returns (82) to the 2-D CAD system.

Figure 5:
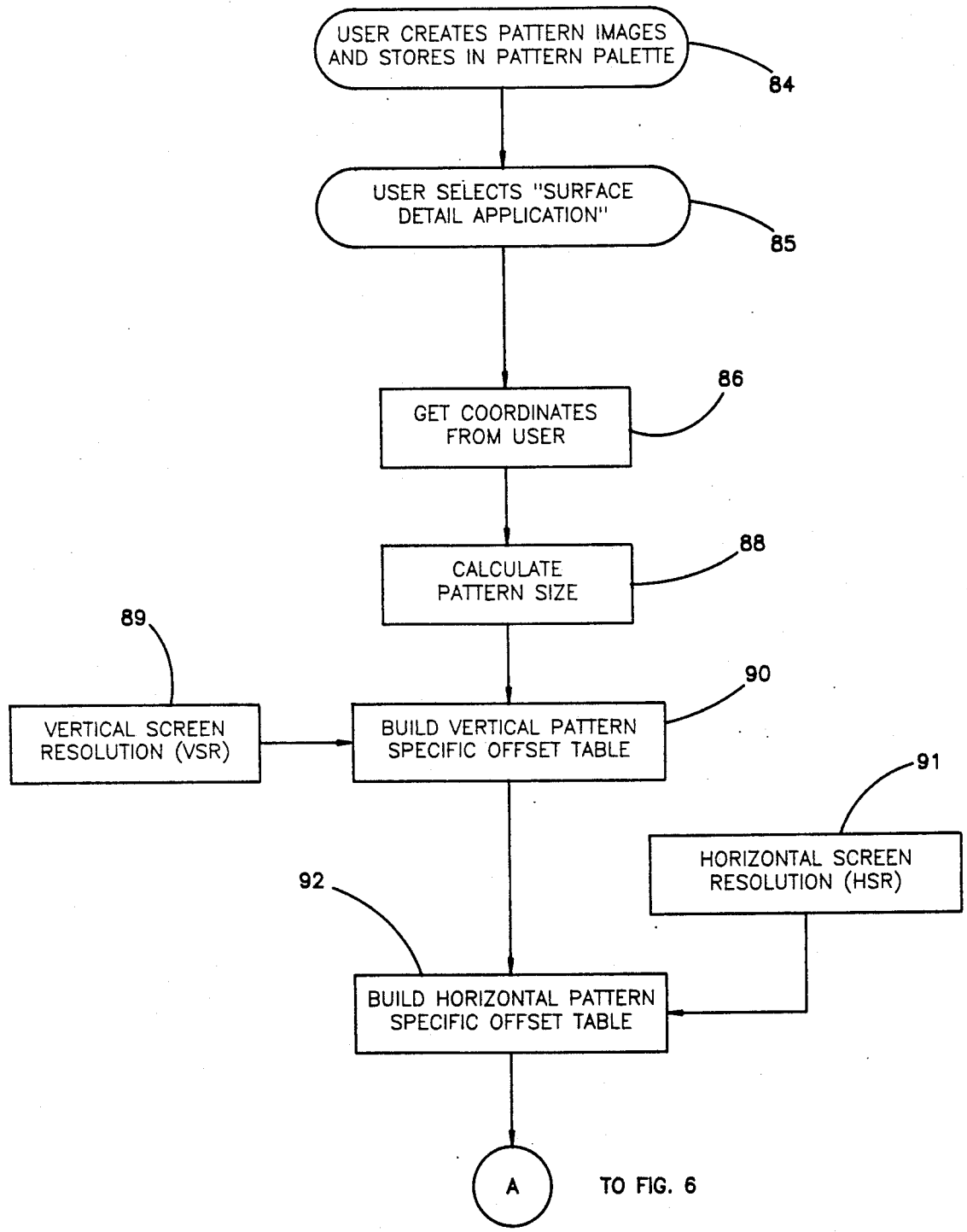
FIG. 5 is a flow chart illustrating the Pattern Specific Offset Table (PSO Table) generation function of the present invention.

The pattern selection function and construction of the Pattern Specific Offset Tables is illustrated in FIG. 5. After inputting (84) patterns into the pattern pallet via an input device such as a digital video camera or through a textile design program, the user selects (85) the "Surface Detail Application" routine. When this routine is selected, the user is prompted to select (86) a desired portion of a pattern by digitizing two coordinates within or around the selected image with an indicating device such as mouse 14. These coordinates are understood to be the opposite corners of the rectangular array of pixels that the user wants to apply as a texture or pattern repeat. The X and Y dimensions of the rectangular array digitized at 86 is measured (88) to establish the vertical pattern dimension (M) and the horizontal pattern dimension (N). The vertical Pattern Specific Offset Table is built (90) by allocating a one-dimensional buffer having a length equal to the vertical screen resolution of the graphic CRT and by storing a sequence of numbers repetitively until the buffer 89 is full. The stored sequence is the set of sequentially ordered pattern offsets, written as integers from 0 to M-1. The horizontal Pattern Specific Offset Table is built (92) by allocating a one-dimensional buffer 91 having a length equal to the horizontal by storing a sequence of numbers repetitively until the buffer 91 is full. The stored sequence is the set of sequentially ordered pattern offsets,
written as integers from 0 to N-1.

Figure 6:
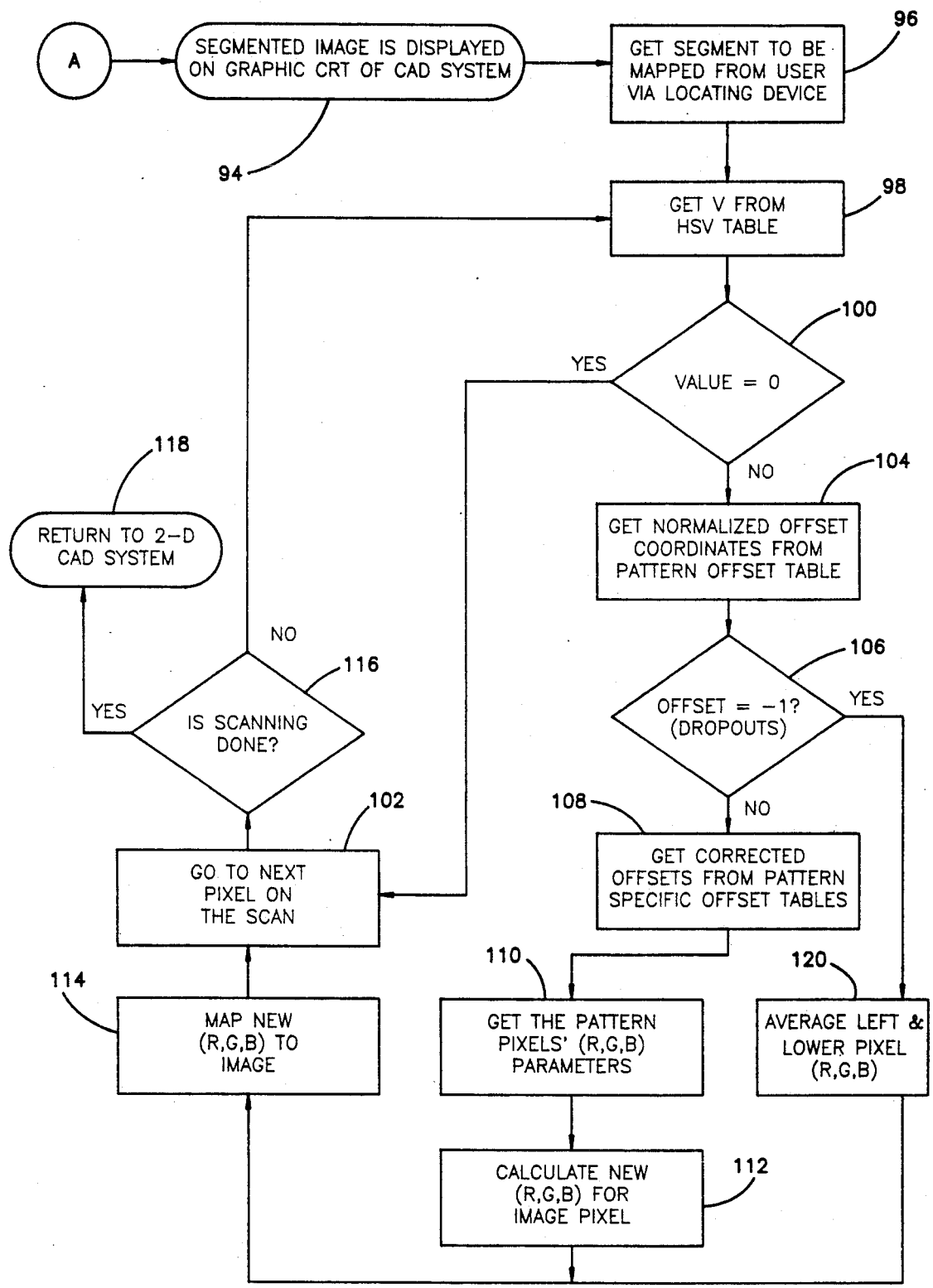
FIG. 6 is a flow chart illustrating the fast surface detail application function of the present invention.

The program passes from FIG. 5 to FIG. 6 for the actual fast surface detail application of the pattern rectangular array, selected and preprocessed in FIG. 5, to a selected segment of a segmented image which was processed by the programs illustrated in FIGS. 3 and 4. With a segmented image displayed (94) on the graphic CRT 10 of the CAD system, the user is prompted (96) to select, with a locating device such as mouse 14, the image segments to which the surface detail is to be applied. The actual surface detail application starts at the lower left corner of the image displayed on the CRT and with pointers to the "lower left" corners of the HSV Table and the Pattern Offset Table and progresses line-by-line from left-to-right and bottom-to-top of the graphic CRT and the tables. For each pixel on the graphic CRT display, the associated value in the HSV Table is selected (98) and examined (100) to determine if its value is equal to 0. If its value is equal to 0, then the image is not defined at the pixel and the program proceeds to examine the next pixel at 102 on the scan. If the value of the pixel in the HSV Table is non-zero, the normalized two-dimensional pattern offset coordinate pair for the corresponding pixel is retrieved at 104 from the Pattern Offset Table. The retrieved coordinate is examined at 106 to determine if it equals an illegal value which, in the illustrated embodiment, is established as −1. If not, then the pixel is not a "dropout" and the corrected offset coordinates are selected (108) from the Pattern Specific Offset Tables by mapping the normalized two-dimensional pattern offset coordinate pair to the Pattern Specific Offset Tables and selecting the appropriate pair of one-dimensional offset coordinates. The corrected offsets coordinates are mapped to the array of pixels making up the selected texture or pattern and one of them is selected. The (R,G,B) parameters for the selected pattern pixel are retrieved (110) and combined with the V parameter of the image pixel according to the following algorithm:

New R = (R X V) divided by 256
New G = (G X V) divided by 256
New B = (B X V) divided by 256

The newly-calculated (R,G,B) parameter is applied to the image (114) and the next pixel on the scan is examined (102). The program passes to 116 where it is determined whether the entire graphic image has been scanned. If so, the program returns to the 2-D CAD system at 118. If additional pixels require scanning, the program returns to 98 for selection of the V parameter of the next pixel.

If it is determined at 106 that the retrieved normalized two-dimensional pattern offset of the image pixel is an illegal value inserted during preprocessing, then no pixel of the array of pixels making up the texture or pattern will map to the image pixel. The program responds to the illegal value determined at 106 by getting the (R,G,B) parameters of the image pixel to the left of the "dropout," in the same scan line, and vertically below the "dropout" in the same vertical column. The (R,G,B) values of these two adjacent pixels are averaged and then applied (114) as a new pixel having the averaged (R,G,B) parameter to substitute in the final image for the "dropout" pixel. Thus, pixel dropout is corrected in the present invention without the bi-linear interpolation required in prior schemes. Not only is the means for substituting for pixel dropouts faster than with previous systems, all dropouts may be corrected in this fashion because a value for the pixel to the left and below the dropout will exist in all cases because the scanning progresses from left-to-right and from bottom-to-top of the graphic CRT image.

As the pattern is being applied to the image, pointers to the proper locations in both the HSV Table and the Pattern Offset Table are maintained in association with the pixel on the graphic CRT that is being processed. In this manner, patterns may be replaced with subsequent patterns, as only the video display image is modified, not the associated image in the HSV and PO Tables. It has been found that surface detail application using the present invention has so significantly decreased processing time that an image may be restored to its original appearance using the fast surface detail application process faster than it can be retrieved from the hard disk of the system. In the illustrated embodiment, the application of surface detail to a full screen image (1024 pixels-by-768 pixels) with 24 color bits per pixel can be performed in less than ten (10) seconds.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. In a computer-assisted design system having a graphic output device, a method for providing surface detail to computer-generated two-dimensional graphic images of three-dimensional objects to create a three-dimensional appearance including generating a perspective mesh on a computer-generated two-dimensional graphic image such that said mesh creates a three-dimensional visual appearance, mapping surface detail to said mesh such that said surface detail produces a three-dimensional appearance and producing on said graphic output device a graphic visual image of said two-dimensional graphic image with said surface detail applied, the improvement comprising:

allocating a two-dimensional buffer at least the size of the two-dimensional graphic image;
 scanning said two-dimensional graphic image pixel-by-pixel to determine location parameters defining a location of each pixel on said two-dimensional graphic image;
 building a table by storing said location parameters of particular ones of said scanned pixels in a corresponding location in said buffer;
 inputted to said computer assisted design system an array of pixels making up a selected surface detail; and
 applying the selected surface detail to said mesh by operating on said array of pixels making up the selected surface detail with said location parameters retrieved from said table during said mapping and thereby producing on said graphic output device a two-dimensional graphic visual image with the selected surface detail applied.

2. The method for providing surface detail in claim 1 in which said step of building a table includes storing two-dimensional offset coordinates of each pixel on said two-dimensional graphic image from reference locations on said perspective mesh and said step of applying the selected surface detail includes mapping said offset coordinates to said array of pixels making up the selected surface detail and selecting the pixels located by said mapping said offset coordinates.

3. The method for providing surface detail in claim 2 in which said step of applying the selected surface detail further includes applying the array of pixels making up the selected surface detail pixel-by-pixel in the same sequence as said step of scanning.

4. The method for providing surface detail in claim 3 in which said step of allocating a two-dimensional buffer includes storing illegal parameter values in substantially all locations in said buffer, said step of building a table includes replacing illegal parameter values with said two-dimensional offset coordinates of scanned pixels and in which said step of applying the selected surface detail further includes testing each location in said table for illegal entries and responding to illegal entries by developing a pixel to apply to the two-dimensional graphic image from characteristics of pixels previously applied to said two-dimensional graphic image.

5. The method for providing surface detail in claim 4 in which said step of building a table includes replacing said two-dimensional offset coordinates stored in said buffer with subsequently scanned said two-dimensional offset coordinates for the same two-dimensional graphic image pixel.

6. The method for providing surface detail in claim 2 in which said step of building a table includes replacing said two-dimensional offset coordinates stored in said buffer with subsequently scanned said two-dimensional offset coordinates for the same two-dimensional graphic image pixel.

7. The method for providing surface detail in claim 2 in which said step of applying the selected surface detail to said mesh includes:

allocating a first one-dimensional buffer having a length at least as great as one dimension of said two-dimensional buffer and a second one-dimensional buffer having a length at least as great as another dimension of said two-dimensional buffer;
 determining the dimensions of the array of pixels making up the selected surface detail;
 storing a repetitive first sequence of one-dimensional offset coordinates in said first one-dimensional buffer, said first sequence having entries representing offset lengths in one dimension of said array of pixels making up the selected surface detail;
 storing a repetitive second sequence of one-dimensional offset coordinates in said second one-dimensional buffer, said second sequence having entries representing offset lengths in another dimension of said array of pixels making up the selected surface detail;
 mapping said two-dimensional offset coordinates to said one-dimensional buffers and selecting the one-dimensional offset coordinates located by said mapping said two-dimensional offset coordinates; and
 mapping said one-dimensional offset coordinates to said array of pixels making up the selected surface detail and selecting the pixel located by said mapping said one-dimensional offset coordinates.

8. The method for providing surface detail in claim 1 in which said step of building a table further includes storing color parameters of said each pixel of said two-dimensional graphic image and said step of apply the surface detail to the mesh includes modifying color parameters of said array of pixels making up the selected surface detail with said color parameters retrieved from said table.

9. The method for providing surface detail in claim 8 in which said step of storing color parameters further includes selecting the maximum magnitude of a primary color of each pixel on said two-dimensional graphic image as said color parameters.

10. The method for providing surface detail in claim 9 in which said color parameters of said array of pixels making up the selected surface detail includes a primary color of each said array of pixels and in which said step of mapping the selected surface detail includes multiplying the magnitude of each primary color of said array of pixels making up the selected surface detail by said maximum magnitude of a primary color of the corresponding pixel on said two-dimensional graphic image.

11. In a computer-assisted design system having a graphic output device, a method for providing surface detail to computer-generated two-dimensional graphic images of three-dimensional objects to create a three-dimensional appearance comprising the steps of:

inputting to said computer-assisted design system a computer-generated two-dimensional graphic image of a three-dimensional object;

generating a perspective mesh on said computer-generated two-dimensional graphic image such hat said mesh creates a three-dimensional visual appearance;

building in said computer-assisted design system a table of two-dimensional offset coordinates of each pixel on said two-dimensional graphic image from reference locations on said perspective mesh;

inputting to said computer-assisted design system at least one array of pixels making up surface detail;

selecting one said surface detail to be applied to said computer-generated two-dimensional graphic image;

mapping the two-dimensional offset coordinates to the array of pixels making up the selected surface detail and selecting the pixels located by said mapping the two-dimensional offset coordinates; and producing on said graphic output device a graphic visual image of said two-dimensional graphic image with said selected surface detail applied as a function of selected pixels.

12. The method for providing surface detail in claim 11 in which said step of building a table includes allocating a buffer, substantially filling said buffer with illegal data entries and overwriting said illegal data entries with said offset coordinates of each said pixel.

13. The method for providing surface detail in claim 12 in which said step of mapping the two-dimensional offset coordinates includes detecting illegal data entries in said table and constructing a modified pixel from adjacent pixels.

14. The method for providing surface detail in claim 11 in which said step of building a table includes sequentially scanning pixels making up said two-dimensional image and providing at a reference location in said table one of said two-dimensional offset coordinates for only the latter of two scanned pixels having the same said reference location.

15. The method for providing surface detail in claim 11 further including building in said computer-assisted design system first and second tables of one-dimensional offset coordinates of pixels in said array of pixels making up the selected surface detail and in which said step of mapping said two-dimensional offset coordinates includes mapping a first component of said two-dimensional offset coordinates to said first table of one-dimensional offsets and selecting a first one-dimensional offset coordinate located by said mapping a first component, mapping a second component of said two-dimensional offset coordinates to said second table of one-dimensional offsets and selecting a second one-dimensional offset coordinate located by said mapping a second component and mapping said first and second one-dimensional offsets to said array of pixels making up the selected surface detail and selecting the pixel located by said mapping said first and second one-dimensional offsets.

16. The method for providing surface detail in claim 15 in which said table of two-dimensional offset coordinates defines an X-by-Y array of said two-dimensional offset coordinates corresponding to the array of pixels making up the two-dimensional graphic image, in which said first table of one-dimensional offsets has a length of X and in which said second table of one-dimensional offsets has a length of Y.

17. The method for providing surface detail in claim 16 in which said step of building first and second tables of one-dimensional offset coordinates further includes determining the M and N parameters of an M-by-N array of pixels making up the selected surface detail and storing a repetitive sequence including M one-dimensional offset coordinates in said first table of one-dimensional offset coordinates and storing a repetitive sequence including N one-dimensional offset coordinates in said second table of one-dimensional offset coordinates.

18. In a computer-assisted design system having a graphic output device, a method for providing surface detail to computer-generated two-dimensional graphic images of three-dimensional objects comprising the steps of:

inputting to said a computer-assisted design system a computer-generated two-dimensional graphic image of a three-dimensional object;

building in said computer-assisted design system a table of data including shading parameters of each pixel on said computer-generated two-dimensional graphic image;

inputting to said computer-assisted design system at least one array of pixels making up surface detail, each of said pixels in said array having color parameters;

selecting one said surface detail to be applied to said computer-generated two-dimensional graphic image;

mapping an array of pixels making up the selected surface detail to said two-dimensional graphic image;

modifying the color parameters of said array of pixels making up the selected surface detail by data in said table of shading parameters to provide modified pixels to said two-dimensional image; and producing on said graphic output device with said modified pixels a graphic visual image of said two-dimensional graphic image with said selected surface detail applied.

19. The method for providing surface detail in claim 18 in which said step of building a table include storing for each pixel on said two-dimensional graphic image the maximum magnitude of a primary color parameter.

20. The method for providing surface detail in claim 19 in which said step of modifying the color parameters includes multiplying primary color parameters of said array of pixels making up the selected surface detail by said maximum magnitudes in said table and dividing the result by a constant.

21. The method for providing surface detail in claim 20 in which said computer is a digital computer and said constant is 256.

22. In a computer-assisted design system having an output device, a method for providing surface detail to computer-generated two-dimensional graphic images of three-dimensional objects to create a three-dimensional appearance comprising the steps of:

inputting to computer-assisted design system a computer-generated two-dimensional graphic image of a three-dimensional object;

generating a perspective mesh on said computer-generated two-dimensional graphic image such hat said mesh creates a three-dimensional visual appearance;

building in said computer-assisted design system a first table of two-dimensional offset coordinates of each pixel on said two-dimensional graphic image from reference locations on said perspective mesh;

building in said computer-assisted design system a second table of shading characteristics of each pixel on said two-dimensional graphic image;

inputting to said computer-assisted design system at least one array of pixels making up surface detail, each of said pixels in said array having color parameters;

selecting one said surface detail to be applied to said computer-generated two-dimensional graphic image;

mapping the two-dimensional offset coordinates from said first table to the array of pixels making up the selected surface detail and selecting the pixels located by said mapping the two-dimensional offset coordinates;

modifying the color parameters of said array of pixels making up the selected surface detail by data in said second table of shading characteristics to provide modified pixels to said two-dimensional image; and producing on said output device with said modified pixels a graphic visual image of said two-dimensional graphic image with said surface detail applied.

23. The method for providing surface detail in claim 22 in which said step of building a first table includes allocating a buffer, substantially filling said buffer with illegal data entries and overwriting said illegal data entries with said two-dimensional offset coordinates of each pixel on said two-dimensional graphic image.

24. The method for providing surface detail in claim 23 in which said step of producing a graphic visual image includes detecting illegal data entries in said first table and constructing a modified pixel from adjacent pixels.

25. The method for providing surface detail in claim 22 in which said step of building a first table includes sequentially scanning pixels making up said two-dimensional image and providing at a reference location in said first table one of said two-dimensional offset coordinates for only the latter of two scanned pixels having the same said reference location.

26. The method for providing surface detail in claim 22 further including building a third table relating the location of pixels in said array of pixels making up the selected surface detail to locations in said first table and in which said step of mapping said two-dimensional offset coordinates includes mapping said offset coordinates to said third table.

27. The method for providing surface detail in claim 26 in which said third table includes a pair of tables.

28. The method for providing surface detail in claim 22 in which said step of building a second table includes storing the maximum amplitude of a primary color parameter of each pixel on said two-dimensional graphic image.

29. The method for providing surface detail in claim 28 in which said step of modifying includes multiplying the primary color parameters of said array of pixels making up the selected surface detail by said maximum amplitude in said second table and dividing the result by a constant.

30. The method in claim 29 in which said computer is a digital computer and said constant is 256.

31. A system for providing surface detail to computer-generated two-dimensional graphic images of three-dimensional objects to create a three-dimensional appearance comprising:

means for producing a two-dimensional image of a three-dimensional object in a form for storage and processing by a digital computer said two-dimensional image being made up of a multitude of pixels, each pixel in said two-dimensional image having parameters that determine the effect that the particular pixel will having in producing said two-dimensional image;

means for generating a perspective mesh on two-dimensional graphic images such that said mesh creates a three-dimensional visual appearance;

a two-dimensional buffer having at least the size of a two-dimensional graphic image;

means for scanning said two-dimensional graphic image pixel-by-pixel and for determining said parameters of each scanned pixel;

calculating means responsive to said parameters for calculating location data defining a location of pixels in said two-dimensional image and for building a two-dimensional data table in said buffer by storing said location data for particular ones of said scanned pixels in a corresponding location in said buffer;

means for storing said table in a data storage unit accessible by said digital computer;

means for producing a rectangular array of pixels making up a two-dimensional image of surface detail for storage and processing by a digital computer;

means for storing said array of pixels making up said image of surface detail in a data storage unit accessible by said digital computer;

means responsive to at least said data in said table for mapping said array of pixels making up said image of surface detail to said mesh within said two-dimensional image to create a graphic visual image of said two-dimensional image, covered by said surface detail, giving a three-dimensional appearance.

32. The system in claim 31 in which said location data includes the two-dimensional offset coordinates of each said particular pixel on said two-dimensional graphic image from reference locations on said perspective mesh and said mapping means includes means responsive to said two-dimensional offset coordinates for mapping to said array of pixels making up the image of surface detail and for selecting the appropriate pixels.

33. The system in claim 32 in which said means for mapping includes means for applying the array of pixels making up the image of surface detail pixel-by-pixel in the same sequence as said scanning means.

34. The system in claim 33 in which said means for building a table includes means for storing illegal data values in substantially all locations in said buffer and means for replacing illegal data with said two-dimensional offset coordinates and in which said means for mapping includes means for testing each location in said buffer for illegal data and for responding to illegal data by developing a substitute pixel to apply to the graphic image from characteristics of pixels previously applied to said graphic image.

35. The system in claim 34 in which said means for building a two-dimensional table includes means for replacing said two-dimensional offset coordinates with subsequently scanned said two-dimensional offset coordinates for the same said particular pixel in said two-dimensional image.

36. The system in claim 32 in which said means for building a two-dimensional data table includes means for replacing said two-dimensional offset coordinates with subsequently scanned said two-dimensional offset coordinates for the same said particular pixel in said two-dimensional image.

37. The system in claim 32 further including:
a first one-dimensional buffer having a length at least as great as one dimension of said two-dimensional buffer and a second one-dimensional buffer having a length at least as great as another dimension of said two-dimensional buffer;
means for determining the dimensions of the rectangular array of pixels making up the image of surface detail;
means responsive to said determining means for building a first one-dimensional table by storing a repetitive first sequence of one-dimensional offset coordinates in said first one-dimensional buffer, said first sequence representing offset lengths in one dimension of said rectangular array of pixels making up the image of surface detail;
means responsive to said determining means for building a second one-dimensional table by storing a repetitive second sequence of one-dimensional offset coordinates in said second one-dimensional buffer, said second sequence representing offset lengths in another dimension of said rectangular array of pixels making up the image of surface detail;
means for mapping said two-dimensional offset coordinates to said first and second one-dimension tables and selecting the appropriate one-dimensional offset coordinates; and
means for mapping said one-dimensional offset coordinates to said array of pixels making up the image of surface detail and selecting the appropriate pixels.

38. The system in claim 31 in which said parameters include the magnitudes of at least two primary colors of said each pixel of said two-dimensional graphic image and said mapping means includes means for modifying a color parameter of a corresponding pixel in said array of pixels making up the image of surface detail as a function of said at least two primary colors.

39. The system in claim 38 in which said calculating means includes means for selecting the maximum magnitude of a primary color of each pixel of said two-dimensional graphic image as said data.

40. The system in claim 39 in which said color parameter of a corresponding pixel in said array includes a primary color of the particular pixel in said array of pixels making up the image of surface detail and said mapping means includes means for multiplying the magnitude of each primary color of pixels selected from said array of pixels making up the image of surface detail by the data in said table for the corresponding pixel of said two-dimensional graphic image.

* * * * *

UNITED STATES PATENT AND TRADEMARK OFFICE
CERTIFICATE OF CORRECTION

PATENT NO. : 5,175,806

DATED : December 29, 1992

INVENTOR(S) : Joshua E. Muskovitz, Robert S. Newton and Tirthawan Tanade

It is certified that error appears in the above-identified patent and that said Letters Patent is hereby corrected as shown below:

On the title page:
Abstract, line 4:
    "preprocessisng" should be --preprocessing--.

Column 11, claim 1, line 29:
    "inputted" should be --inputting--.

Column 13, claim 11, line 2:
    "hat" should be --that--.

Column 14, claim 22, line 61:
    "hat" should be --that--.

Signed and Sealed this

Twenty-ninth Day of March, 1994

*Attest:*

BRUCE LEHMAN

*Attesting Officer*     *Commissioner of Patents and Trademarks*